Aug. 9, 1960  S. G. WOODWARD ET AL  2,948,272
FUEL SUPPLY SYSTEM
Filed Nov. 16, 1956  3 Sheets-Sheet 2
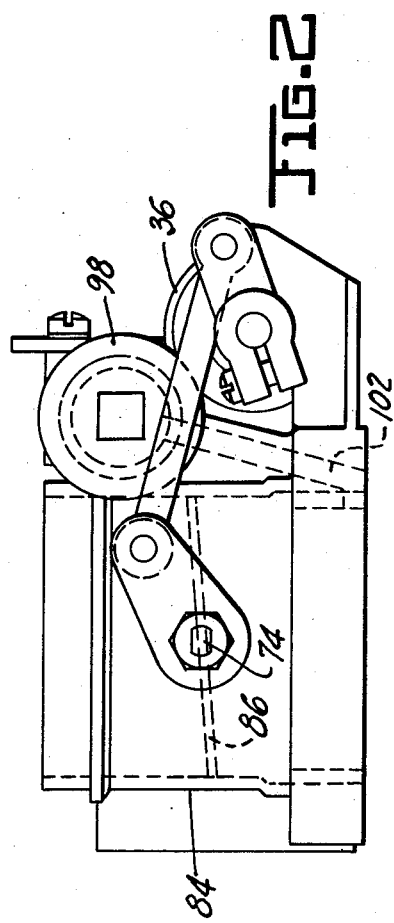
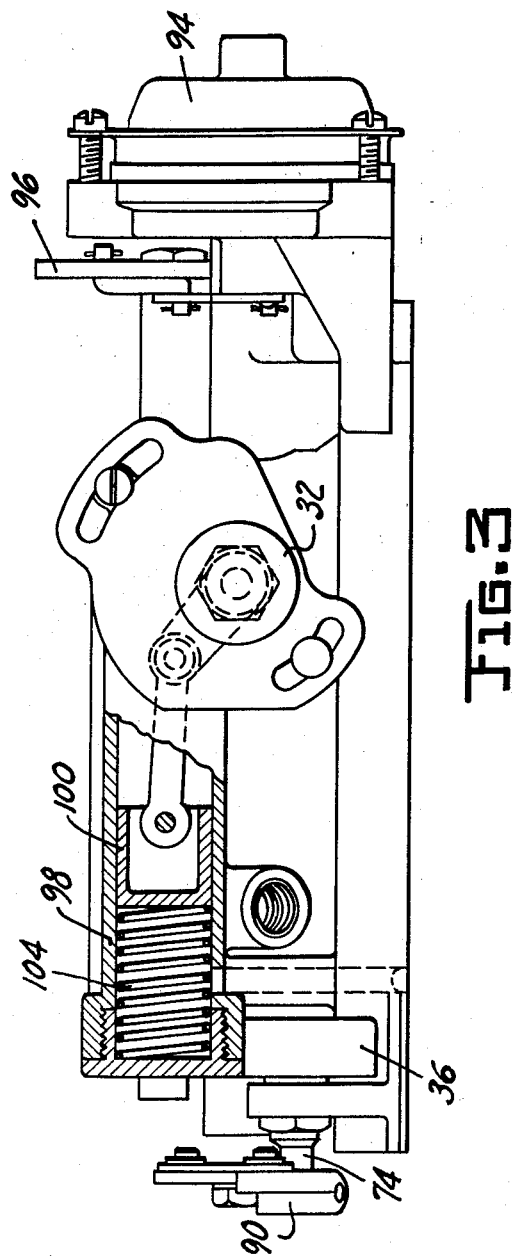
INVENTOR
STEPHEN G. WOODWARD
CURTIS A. HARTMAN
BY
James L. O'Brien
ATTORNEY

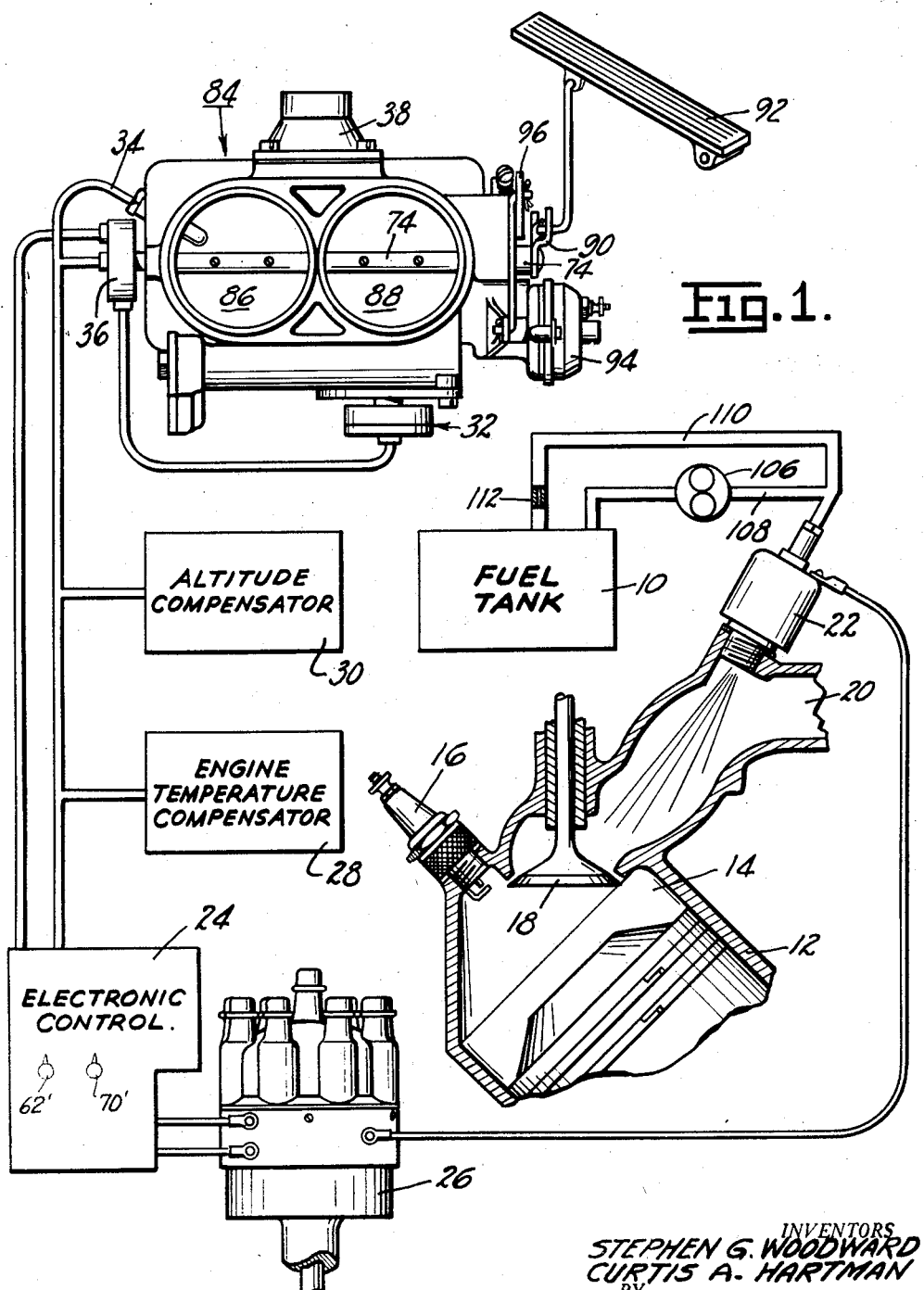

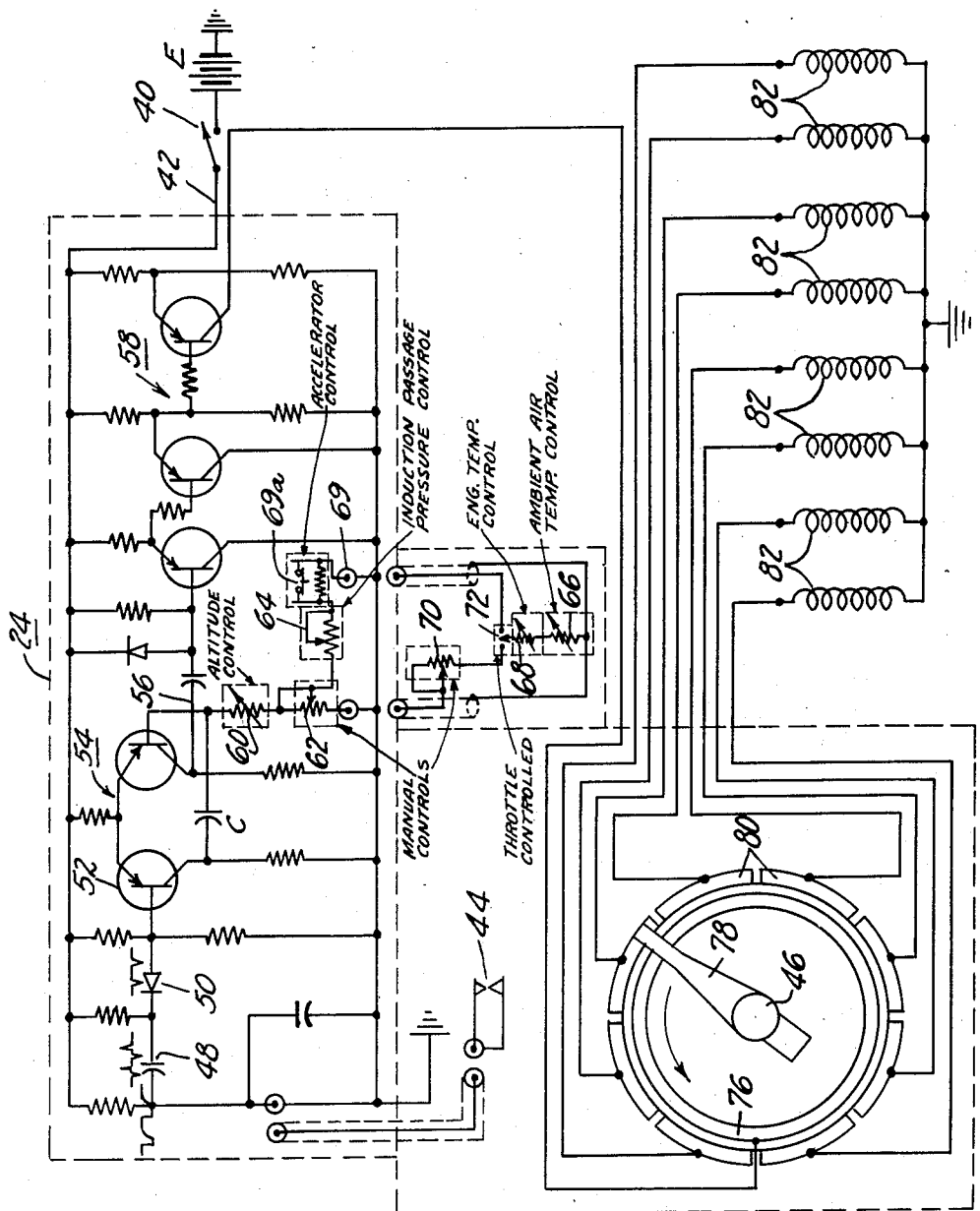

United States Patent Office 2,948,272
Patented Aug. 9, 1960

2,948,272

FUEL SUPPLY SYSTEM

Stephen G. Woodward and Curtis A. Hartman, Elmira, N.Y., assignors to Bendix Aviation Corporation, South Bend, Ind., a corporation of Delaware Filed Nov. 16, 1956, Ser. No. 622,617

7 Claims. (Cl. 123—119)

The present invention relates generally to fuel supply systems for engines and more particularly to a control for such systems incorporating an alternative low air flow and normal operation control.

A fuel supply system of the general type to which our invention is applicable is described and claimed in U.S. application Serial No. 567,688 filed February 24, 1956 in the names of Robert W. Sutton, Stephen G. Woodward and Curtis A. Hartman assigned to the assignee of the present invention and now abandoned. In such a system the quantity of fuel supplied to an engine is controlled by periodically energizing a fuel valve as a function of engine speed and by varying the time duration of opening of said valve. The start of injection is controlled by a switch operated as a function of engine speed; and the time duration of injection is regulated, as a function of engine operating conditions including induction passage pressure. Depending upon engine characteristics, at low air flows induction passage pressure is unstable customarily tending to vary in a somewhat sinusoidal fashion.

Regulation of fuel flow by an unstable pressure would by itself cause the engine to hunt or vary in speed in accordance with variations of the pressure. However, in a system where the start of injection is controlled independently of the random fluctuations of induction passage pressure, successive injections may occur at widely varying values of induction passage pressure so as to cause wide variations in the fuel discharged on each injection which results in roughness and hunting in the operation of the engine.

It is accordingly an object of the invention to provide a control for the engine fuel supply system to reduce or eliminate engine roughness or hunting.

It is a further object of the invention to provide a control for a fuel supply system during low air flow operation of an engine which may be adjusted without effecting the operation of the engine at increased air flows.

It is a still further object of the invention to provide an adjustable stable reference for a fuel supply system to accommodate for differences in engine characteristics.

Other objects and advantages of the invention will be readily apparent from the following detailed description taken in connection with the appended drawings in which:

Figure 1 is a schematic view of our fuel injection system;

Figure 2 is a side view of the throttle body shown in Figure 1;

Figure 3 is a front view of the throttle body; and

Figure 4 is a circuit diagram of the electronic control shown in Figure 1.

Referring now to the drawings and more particularly to Figure 1, numeral 10 designates a source of fuel, 12 an engine having a cylinder or cumbustion chamber 14, a spark plug 16, an intake valve 18, an induction passage 20 and a fuel injector 22 mounted thereon. The number of injectors 22 conveniently corresponds with a number of combustion chambers 14 although the proportion of injectors to combustion chambers may be increased or decreased as desired.

The injectors 22 are arranged to be actuated by an electronic control 24 which is triggered by and connected to an appropriate injector 22 by trigger-distributor unit 26. Unit 26 triggers or energizes the electronic control 24 which remains energized for a controlled time duration. The output of the control 24 is connected to an appropriate injector 22 through unit 26 whereby the injector discharges fuel for the time duration that the electronic control remains energized.

The time that electronic control 24 remains energized is regulated by various sensory elements including engine temperature compensator 28, altitude compensator 30, induction passage pressure responsive element 32, ambient air temperature compensator 34 and low air flow control 36. The time duration of energization may also be regulated by the acceleration control 38 disclosed and claimed in our application file S.N. 622,618 filed of even date herewith. The injector 22 and trigger-distributor unit 26 are more fully disclosed and claimed in copending application Serial No. 567,688, supra, and are shown schematically in Figure 4.

Referring now to Figure 4, E designates a source of electrical energy connected through a switch 40 and conductor 42 with a switch 44 located in injector-distributor unit 26. Switch 44 is mounted for actuation by shaft 46 which is adapted to be driven as a function of engine speed and when actuated produces a series of pulses which are transformed by condenser 48 and rectifier 50 into a series of negative voltage spikes which are effective to trigger a normally non-conducting transistor 52 in multivibrator unit 54. The multivibrator 54 produces a pulse in conductor 56, the width of which is a function of the time constant to be described. In our invention alternative circuits are provided to determine the time constant of the multi-vibrator 54. In describing the circuitry of the time constant in a specific embodiment a resistive-capacitive combination is used. It is to be understood however that the circuits may be inductive-resistive or combinations thereof and that while the resistive elements are described as variable that the inductive or capacitive elements could equally as well be varied. The first of the circuits includes source E, conductor 42, multi-vibrator 54 and a power amplifier 58. The time constant of this first circuit is determined by condenser C and variable resistors or potentiometers 60, 62, 64, 66 and 68 which are respectively variable by altitude compensator 30, manually by means of knob 62', induction passage pressure responsive element 32, ambient air compensator 34 and engine temperature compensator 28. Acceleration control 38 is also included in the first circuit and comprises a normally shunted resistor 69. Control 38 is responsive to changes in induction passage pressure to open a switch 69a for a time whereby resistor 69 is effectively added to the circuit. The second of these circuits includes source E, conductor 42, switch 44, multivibrator 54 and power amplifier 58. In the second circuit the time constant includes condenser C, variable resistors or potentiometers 60, 62, 70, 66 and 68. Potentiometer 70 is manually variable by means of knob 70'.

A switch 72 in low air flow control 36 operatively connected to a throttle shaft 74 is adapted to alternatively select one of the two circuits to control the time constant of the electronic control 24. The first circuit is adapted to control the time constant during normal operation and is sometimes referred to the normal circuit. The second circuit is adapted to control the time constant during low air flow conditions.

In the embodiment described switch 72 is actuated by the throttle shaft but in the other embodiments may be actuated by an engine operating condition indicative of low flow such as manifold vacuum. When the switch 72 is positioned to render the second circuit effective the time constant is varied independently of induction passage pressure. The manually adjustable potentiometer 70 in the second circuit provides a stable reference for the control of the engine during idling and may be adjusted without effecting the normal operation of the engine which is under control of the first circuit.

Whenever the engine is being driven by the vehicle such as during deceleration with the throttle closed the injector supplies just sufficient fuel for idling whereby noxious gases are substantially eliminated. In other embodiments if further reduction in fuel is desired during deceleration an induction passage pressure responsive switch may be placed in the second circuit to open said circuit whenever the induction pressure drops to a predetermined low absolute value.

The electronic control 24 delivers a pulse of electrical energy to a commutator ring 76 in the trigger-distributor unit 26. A wiper arm 78 secured to shaft 46 is adapted to successively connect the commutator to spaced segments 80 which are respectively connected to solenoids 82. The number of segments 80 may conveniently correspond to the number of solenoids 82 although this proportion may be increased or decreased.

A throttle body unit 84 is adapted for mounting in the induction passage and is provided with valves 86 and 88 mounted in a shaft 74 therein. A throttle lever 90 secured to shaft 74 is operatively connected to a conventional acceleration pedal 92 for actuation thereby. A thermostatic control 94 is arranged to position a fast idle cam 96 in the path of lever 90 to prevent the throttle valves from fully closing when the control 94 is cold.

Element 32 is mounted on one side of the throttle body 84 and includes a cylinder 98 with a piston 100 reciprocably mounted therein. Cylinder 98 is connected to the induction passage below the throttle valves by conduit 102. Piston 100 is responsive in one direction to induction passage pressure and is opposed by a spring 104 in cylinder 98.

In operation, fuel from tank 10 is placed under pressure by pump 106 and delivered to the injectors through conduit 108. The pressure in conduit 108 may be regulated as desired by appropriate means (not shown). The quantity of fuel discharged into the induction passage 20 is controlled by the pressure of fuel in conduit 108 and by the time duration of the valve opening. The excess fuel supplied to the injector is returned to the fuel tank through conduit 110 and restriction 112. The time duration of valve opening injector 22 is determined by the electronic control 24 which in turn is determined by the time constant of the appropriate circuit therein. The first circuit provides for a manual adjustment to compensate for different engine characteristics in the normal operating range. In addition to the manual adjustment the first circuit provides for changes in the time constant in response to changes in engine temperature, atmospheric pressure, ambient air temperature, and induction passage pressure. During low air flows, when the induction passage pressure is unstable, control of the time constant is transferred from the first circuit to the second circuit by switch 72. In the second circuit the induction passage pressure responsive potentiometer is excluded and control of the time constant is regulated by a low air flow manually adjustable resistor. Thus when control of the injector is transferred to the second circuit by switch 72 a stable reference is provided whereby smooth engine operation without hunting is provided. Adjustment of the manually variable resistor 70 for desired idling operation may be accomplished without changing the operation of the injectors in other engine operating conditions.

While only one embodiment of the invention has been described it will be readily apparent to those skilled in the art that various changes and arrangements can be made to change the objects of the invention without departing from the spirit thereof.

We claim:

1. In a fuel supply system for an engine having a throttle and an induction passage, means energizable to supply fuel to said engine, means for energizing said first mentioned means for a controllable time duration, means responsive to induction passage pressure for varying said time duration, mnaually variable means for varying said time duration, and means operatively connected to the throttle for selectively connecting in accordance with throttle position the last two mentioned means to the second mentioned means to render one of said last two mentioned means effective at a time to vary said time duration.

2. In a fuel supply system for an engine having a throttle, an induction passage and a fuel valve, means energizable to open said valve, a circuit for energizing said means, means in said circuit for controlling the time duration of opening of said valve, impedance means responsive to induction passage pressure adapted when connected in said circuit to regulate said time duration, manually variable impedance means adapted when connected in said circuit to regulate said time duration, and means responsive to throttle movement to alternatively connect said impedance means in said circuit.

3. In a fuel supply system for an engine having a throttle, an electrically controllable fuel valve, a normal circuit for said valve, an idling circuit for said valve, means responsive to throttle movement for selectively rendering one of said circuits at a time operative to actuate said valve.

4. In a fuel supply system for an engine having a throttle, an induction passage and an electrically controllable fuel valve, a first circuit, a second circuit, a switch actuable by movement of said throttle to one position to connect said first circuit to said valve and to another position to connect said second circuit to said valve, and means responsive to induction passage pressure for varying the time duration of energization of said first circuit.

5. In a fuel supply system for an engine having a throttle and an electrically controllable fuel valve, a first circuit, a second circuit, a throttle actuated means for alternatively connecting said circuits to said valve, means in said first circuit responsive to an engine pressure for regulating the time duration of energization of said first circuit, and an adjustable means in said second circuit for regulating the time duration of energization of said second circuit.

6. In a fuel supply system for an engine having an electrically controllable fuel valve, a first circuit, a second circuit, means responsive to an engine operating condition for alternatively connecting said circuits to said valve, means responsive to an engine pressure in said first circuit for regulating the time duration of energization of said first circuit and adjustable means for said second circuit for regulating the time duration of energization of said second circuit.

7. In a fuel supply system for an engine having an induction passage and an electrically controllable fuel valve, a first circuit, a second circuit, means responsive to an engine operating condition for alternatively connecting said circuits to said valve, means responsive to induction passage pressure in said first circuit for regulating the time duration of energization thereof, and an adjustable means in said second circuit for regulating the time duration of energization thereof.

References Cited in the file of this patent

UNITED STATES PATENTS

| 1,803,666 | French | May 5, 1931 |
| 1,999,221 | Walker et al. | Apr. 30, 1935 |
| 2,310,773 | Fuscaldo | Feb. 9, 1943 |
| 2,598,754 | Booth | June 3, 1952 |

FOREIGN PATENTS

| 971,274 | France | July 5, 1950 |
| 983,911 | France | Feb. 21, 1951 |

UNITED STATES PATENT OFFICE
CERTIFICATE OF CORRECTION

Patent No. 2,948,272                            August 9, 1960

Stephen G. Woodward et al.

It is hereby certified that error appears in the printed specification of the above numbered patent requiring correction and that the said Letters Patent should read as corrected below.

Column 2, line 69, after "low" insert -- air --.

Signed and sealed this 11th day of April 1961.

(SEAL)
Attest:

ERNEST W. SWIDER                        ARTHUR W. CROCKER

Attesting Officer                            Acting Commissioner of Patents